March 21, 1950     P. ROBINSON     2,501,616
SOLDERING IRON TIP
Filed April 8, 1947
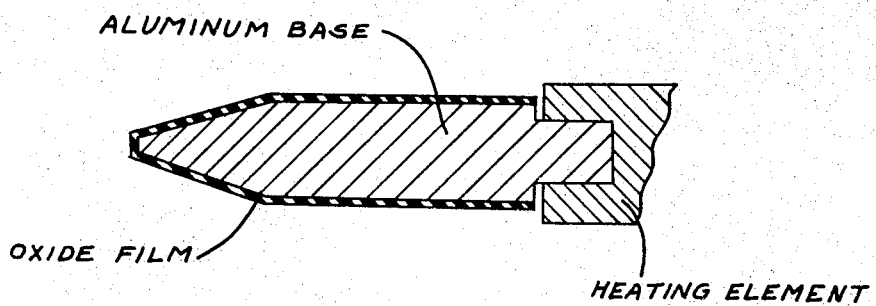
PRESTON ROBINSON
INVENTOR
BY
ATTORNEY Patented Mar. 21, 1950

2,501,616

UNITED STATES PATENT OFFICE 2,501,616

SOLDERING IRON TIP

Preston Robinson, Williamstown, Mass., assignor to Sprague Electric Company, North Adams, Mass., a corporation of Massachusetts Application April 8, 1947, Serial No. 740,250

5 Claims. (Cl. 113—105)

This invention relates to improved soldering iron tips and means for producing them.

In the past, the tips of soldering irons of the electrically heated and gas heated types have been constructed of copper, iron and similar materials. Copper has been most widely used because of its high heat conductivity and wettability by tin, which appears in solders of many types. Iron has also been used because of its cheapness, general physical durability, etc., altho the heat conductivity is poor. Unfortunately, however, copper tips may not be used for extended periods without formation of eutectic bronzes of copper with tin and other metals found in the solder itself. Customarily, the soldering tip is removed and the surface ground or filed down until a fresh copper surface is exposed. While this renewal is more or less satisfactory from the standpoint of operational characteristics of the renewed tip, it requires time and labor. Particularly, in the case of soldering machines of the automatic and semi-automatic type, it is undesirable to shut down the operation to remove or replace ineffective tips.

It is an object of this invention to overcome the foregoing and related disadvantages. A further object is to produce a new and improved soldering iron tip. A still further object is to produce a soldering iron tip which may be used for extended periods of time without alloying or scaling. Additional objects will become apparent from the following description and claims.

These objects are attained in accordance with the invention wherein there is produced a soldering iron tip comprising an aluminum member upon the surface of which is formed a thin, hard integrally bonded layer of aluminum oxide. In a more restricted sense this invention is concerned with a soldering iron tip comprising an aluminum base element upon the surface of which is formed a layer of aluminum oxide less than .003" in thickness. In a still more restricted sense the invention is concerned with a soldering iron tip comprising an aluminum element of purity of at least 99% upon the working surface of which is formed an integrally bonded layer of aluminum oxide of thickness of between about .003" and about .0001". The invention is also concerned with soldering irons employing the tips of the invention.

I have discovered a novel soldering tip capable of extended operation without failure due to any cause, the tip possessing all of these desirable characteristics of copper tips while at the same time avoiding the disadvantages inherent therein.

According to my invention, I produce a soldering tip comprising an aluminum rod or bar upon which is formed a thin, integrally bonded layer of aluminum oxide. The aluminum possesses a relatively high heat conductivity at the soldering temperature. The aluminum oxide film thereon is sufficiently thin to permit rapid and evenly distributed heat transfer between the aluminum and the solder while at the same time is physically durable and wear resisting. According to a further and limited embodiment of my invention, the aluminum conductor is provided with an oxide film heated to the temperature of operation, and subsequently reformed, that is, is subjected to another filming operation to produce a secondary oxide film in any cracks or other exposed aluminum surfaces resulting from the heating operation.

The formation of the aluminum oxide film may be effected by placing the aluminum base member as the anode in an electrolytic cell containing an electrolyte selected from the class comprising oxalic, boric, tartaric, chromic and related acids and electrolytes commonly employed in film-forming or "anodizing" of aluminum surfaces. The current and/or voltage employed in the forming process is dependent upon the thickness of film desired. For some applications a porous, amorphous type film is desired. This may be produced by forming the aluminum base member with a 5% solution of oxalic acid in water at a voltage of about 50 volts, until the current flow drops down to a low value. For other applications it is desirable to have the birefringent crystalline modification of aluminum oxide. This may be produced by forming the base member in boric acid or solutions of the salts of boric acid.

The thickness of the film is dependent upon the temperature at which the soldering iron is to act as well as other conditions. The thickness is preferably between about .003 and about .0001". According to one of the preferred embodiments of the invention a useful soldering iron tip is produced with an amorphous aluminum oxide layer of a thickness of about .001" to about .003". This particular oxide film will stand up quite favorably at temperatures between about 300° C. and 400° C. which are commonly met with lead-tin type solders.

The purity of the aluminum determines the quality of aluminum oxide film and while good results may be obtained with aluminum of 95% purity, I prefer to use aluminum with a purity of at least 99%. In some cases aluminum alloys with a high aluminum content are satisfactory.

Likewise, alloys of aluminum with other film-forming metals, such as tantalum, titanium etc., are useful.

The aluminum base member is cast or cut into its final desired shape before the forming process and the portion of the soldering iron tip which is connected to the heat element of the soldering device is generally unformed. In this connection my soldering iron tip has the advantage that the radiation of heat is reduced over the conventional copper soldering iron tip, since the color is much lighter.

The appended drawing shows a cross section of a finished soldering iron tip produced in accordance with the invention.

The soldering iron tips of the invention do not affect the life of the solder. Soldering irons of either the gas or electrically heated types need not be tinned before use nor do they require frequent dressing of the surface to remove the alloyed layer. Any shape can be made and the oxide layer formed on the working surface thereafter. Damaged irons are easily repaired by stripping the oxide film in a suitable solvent and reforming the tip.

As many widely different embodiments of this invention may be made without departing from the spirit and scope hereof, it is to be understood that the invention is not limited to the specific embodiments hereof except as defined in the appended claims:

What I claim is:

1. A soldering iron tip comprising an aluminum base member with an integrally bonded aluminum oxide film of thickness between about .003" and about .0001"

2. A soldering iron tip comprising an aluminum base member the working surface of which is provided with an integrally bonded layer of amorphous aluminum oxide of thickness between .003" and .001".

3. A soldering iron tip as claimed in claim 1 wherein the aluminum base member is composed of aluminum having a purity of at least 99%.

4. A soldering iron tip as claimed in claim 1 wherein the aluminum oxide film is anodically formed.

5. A soldering iron tip as claimed in claim 1 wherein the aluminum oxide is composed of the birefringent crystalline modification of aluminum oxide.

PRESTON ROBINSON.

REFERENCES CITED

The following references are of record in the file of this patent:

UNITED STATES PATENTS

| Number | Name | Date |
|---|---|---|
| 736,283 | Manley | Aug. 11, 1903 |
| 1,221,566 | Moench | Apr. 3, 1917 |
| 1,751,213 | McCulloch | Mar. 18, 1930 |
| 1,869,041 | Bensington | July 26, 1932 |
| 1,938,630 | Kuula | Dec. 12, 1933 |
| 1,978,112 | Malby | Oct. 23, 1934 |
| 2,157,155 | Work | May 9, 1939 |
| 2,356,583 | Hampton | Aug. 22, 1944 |

OTHER REFERENCES

Alum. Industry, pub. 1930 by McGraw, vol. II.